US012203289B2

(12) United States Patent
Backhaus et al.

(10) Patent No.: US 12,203,289 B2
(45) Date of Patent: Jan. 21, 2025

(54) LOCKING DEVICE

(71) Applicants: BURG Lüling GmbH & Co. KG, Hagen (DE); USM U. Schärer Söhne AG, Munsingen (CH)

(72) Inventors: Dirk Backhaus, Hagen (DE); Christian Lüthi, Münsingen (CH)

(73) Assignees: BURG Lüling GmbH &Co. KG, Hagen (DE); USM U. Schärer Söhne AG, Münsingen (CH)

( * ) Notice: Subject to any disclaimer, the term of this patent is extended or adjusted under 35 U.S.C. 154(b) by 179 days.

(21) Appl. No.: 17/999,936

(22) PCT Filed: Jun. 18, 2021

(86) PCT No.: PCT/EP2021/066568
§ 371 (c)(1),
(2) Date: Nov. 28, 2022

(87) PCT Pub. No.: WO2021/259776
PCT Pub. Date: Dec. 30, 2021

(65) Prior Publication Data

US 2023/0250676 A1 Aug. 10, 2023

(30) Foreign Application Priority Data

Jun. 26, 2020 (DE) ..................... 20 2020 103 687.4

(51) Int. Cl.
*E05B 47/06* (2006.01)
*E05B 65/44* (2006.01)
(Continued)

(52) U.S. Cl.
CPC .......... *E05B 47/0649* (2013.01); *E05C 3/042* (2013.01); *E05B 65/44* (2013.01); *E05B 65/52* (2013.01)

(58) Field of Classification Search
CPC ...... E05B 47/00; E05B 47/06; E05B 47/0607; E05B 47/0619; E05B 47/0626;
(Continued)

(56) References Cited

U.S. PATENT DOCUMENTS 11,866,958 B2 * 1/2024 Backhaus ............. E05B 47/004
2002/0139156 A1 * 10/2002 Aramburu ........... E05B 47/0692 70/218
(Continued)

FOREIGN PATENT DOCUMENTS

DE 7518880 U 10/1975
DE 202005006957 U1 9/2005
(Continued)

OTHER PUBLICATIONS

International Search Report in application No. PCT/EP2021/066568, dated Oct. 19, 2021.

*Primary Examiner* — Nathan Cumar
(74) *Attorney, Agent, or Firm* — Oppedahl Patent Law Firm LLC

(57) ABSTRACT

The invention relates to an improved locking device for the closure of doors on cabinets, of boxes or compartments, which offers high resistance to unauthorized attack and, in particular, can take up high torques. For this purpose, use is made of a coupling arrangement having a manually or electronically movable actuating member, a driver (40), which interacts with the actuating member, and a blocking member (50). The blocking member (50) has the form of a cylinder, the cylinder axis of which runs parallel to the rotor axis (19). The blocking member (50) in its blocking position engages in a depression (17) on the outer side of the rotor (10) or in a depression (22) on the inner side of the wall (21) of the stator (20) and is held in this blocking position by spring force.

19 Claims, 6 Drawing Sheets

Figure 3:
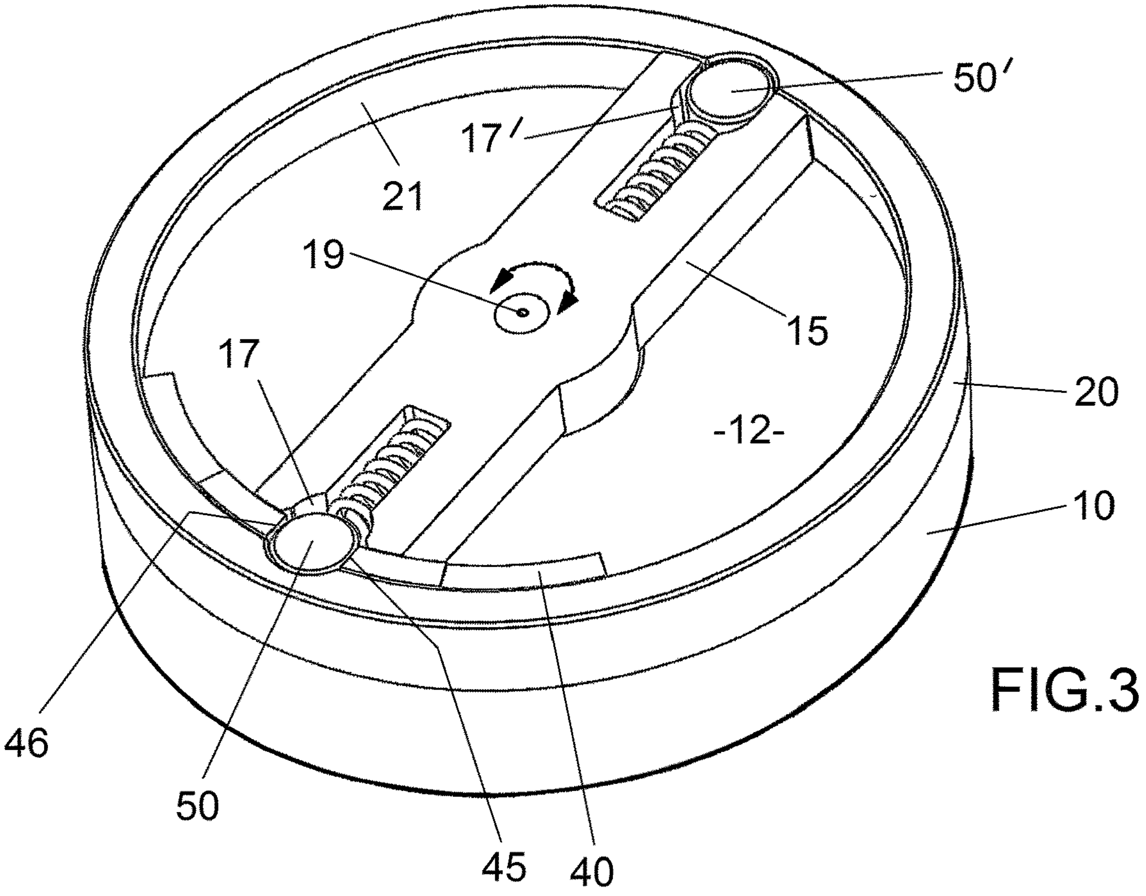

(51) Int. Cl.
*E05B 65/52* (2006.01)
*E05C 3/04* (2006.01)

(58) Field of Classification Search
CPC ............. E05B 47/0638; E05B 47/0649; E05B 47/0653; E05B 65/00; E05B 65/44; E05B 65/46; E05B 65/461; E05B 65/462; E05B 65/464; E05B 65/465; E05B 65/52; E05B 65/5207; E05B 65/5223; E05B 65/523; E05B 65/5238; E05B 65/5246; E05C 3/00; E05C 3/02; E05C 3/04; E05C 3/041; E05C 3/042; E05C 3/043; E05C 3/044
USPC .............................................................. 70/78
See application file for complete search history.

(56) References Cited

U.S. PATENT DOCUMENTS

| | | | | |
|---|---|---|---|---|
| 2016/0186463 | A1* | 6/2016 | Roatis | E05C 3/12<br>70/266 |
| 2016/0244995 | A1* | 8/2016 | Gartner | E05B 37/00 |

FOREIGN PATENT DOCUMENTS

| | | | | |
|---|---|---|---|---|
| DE | 202009006211 | U1 | 9/2009 | |
| DE | 102016217549 | A1 | 3/2018 | |
| DE | 202020103687 | A1 | 8/2020 | |
| WO | WO-2008058415 | A1 * | 5/2008 | E05B 47/0011 |

* cited by examiner

FIG.1
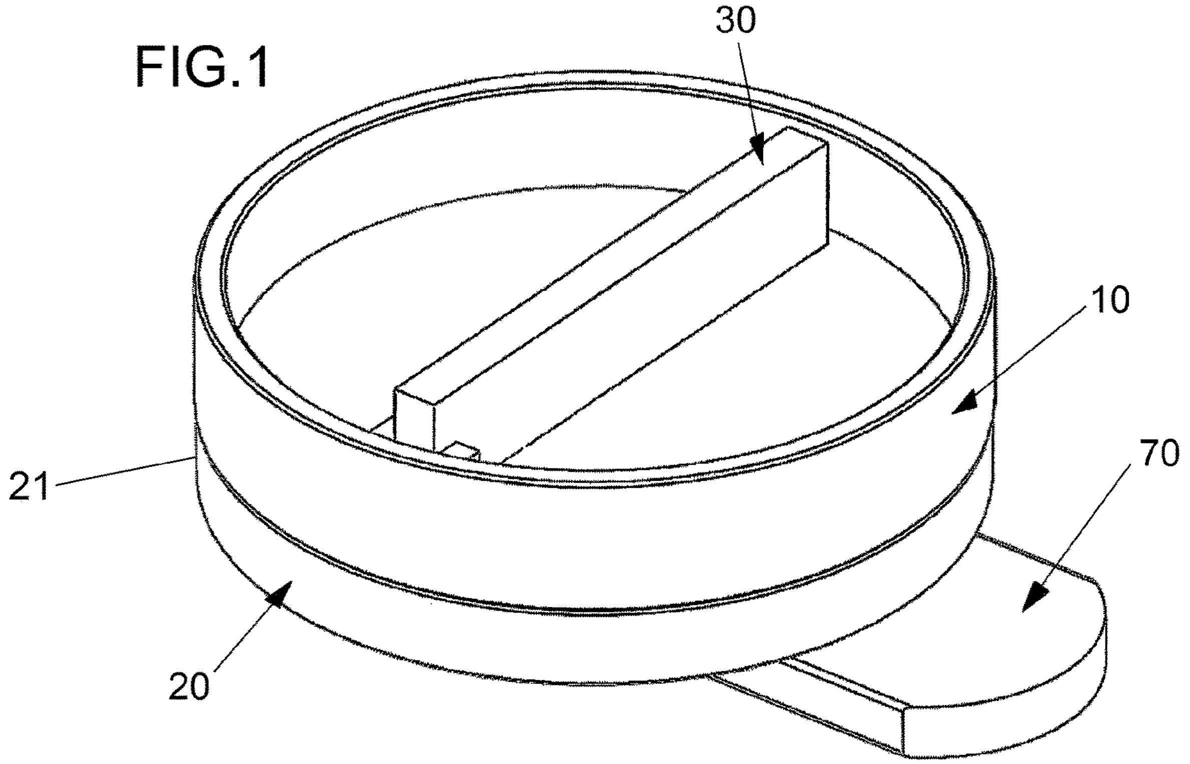
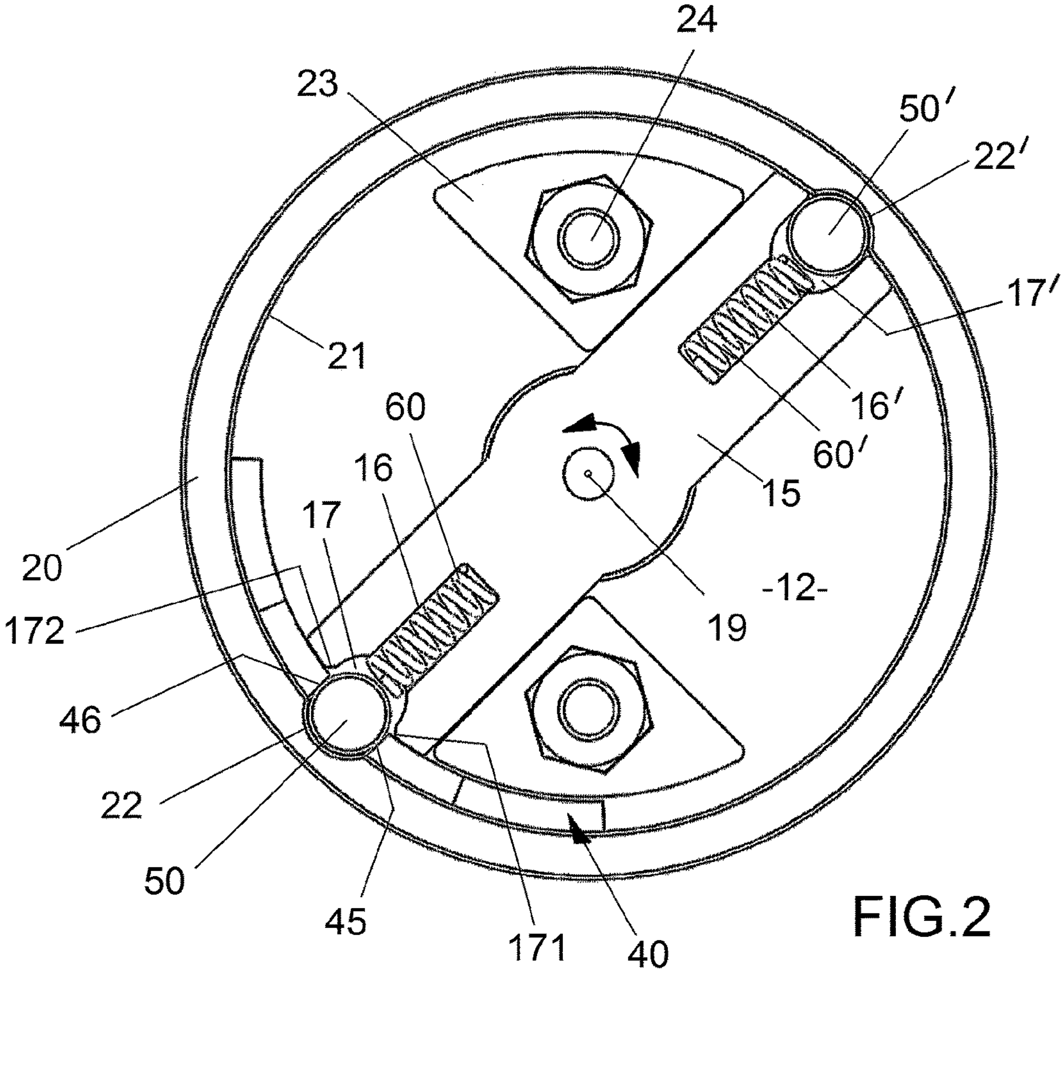
FIG.2

LOCKING DEVICE

The invention relates to a locking device for closing doors on cabinets, boxes or compartments.

It is known to provide a door with a locking device. A locking element of the locking device interacts with corresponding closing plates on the cabinet, on the box or on the compartment to be closed. In this case, the locking element can be a bolt or a push rod. In order to prevent unauthorized opening of the door, it is furthermore known to equip a locking device with a mechanical lock, such as a lock cylinder or an electronic lock, and to grant only authorized persons access or access. Such closing devices have a high level of safety. Unauthorized attempts therefore attempt to open the locking device by turning or displacing the locking element. In such an unauthorized attack from the outside, the locking device must resist a considerable resistance.

It is therefore an object of the invention to provide an improved locking device which offers a high resistance to an unauthorized attack on the locking device, in particular can absorb high torques.

This object is achieved with a locking device having the features of claim 1. Advantageous embodiments are described in the dependent claims.

The new locking device for closing doors on cabinets, boxes or compartments comprises a housing for mounting on the door, wherein the housing forms the stator of the locking device and is pot-like, that is to say has a floor which can be placed on the door and which is fastened to the door leaf. A locking element acts on the other side of the door in a known manner with a closing plate on the cabinet, box or the compartment to be closed. The rotor is directly or indirectly connected to the movable locking element. As a result of a movement of the rotor in both directions of rotation, the locking element is moved from the locking position into the unlocking position or back into the locking position. For this purpose, the rotor is rotatably mounted on the housing. The new locking device comprises a coupling arrangement, wherein a locking mechanism prevents an unauthorized rotation of the rotor and thus also a rotation of the locking element. For this purpose, the coupling arrangement comprises a manually or electronically adjustable actuator, a movable driver and a locking member. The blocking member, which is displaceable between a blocking position and a release position, enables the movement of the rotor only in its release position. The actuator has two positions, a decoupled rest position, where the rotational movement of the rotor is prevented by the locking member and a coupled position where a movement of the rotor is possible.

The locking member is in the form of a cylinder, wherein the cylinder axis runs parallel to the rotor axis. In its blocking position, the blocking member dips into a depression on the inner side of the wall of the stator or on the outside of the rotor. The size of this crescent-shaped trough is adapted to the cylinder radius of the locking member. In the blocking position, the blocking member is pressed into this depression by a spring force, and preferably less than one third of the blocking member is located in this depression. In this case, the spring force is exerted by a spring which exerts a spring force radially relative to the rotor axis. The spring for a locking member is held on the rotor when the trough is provided on the stator. The spring is held on the stator when the trough is provided on the rotor.

In order to release the movement of the rotor, the authorized user can put the actuator out of the decoupled rest position into a coupled position where this actuator is coupled to the driver.

In one embodiment, the actuator is mounted on the rotor and, upon rotation of the rotor, the driver is then moved along with the actuator by its coupling. The driver displaces the blocking member out of its blocking position into a release position. In this case, the blocking member is displaced from the stator-side trough by the driver against the acting spring force and is received on the rotor. In order to move the locking part, the driver has, at its lower part arranged below the rotor, a channel which runs in the radial direction and which, in the blocking position of the blocking part, is filled by the latter. In a special way, the parallel side surfaces of the channel act as stop surfaces on the locking member. They drive the blocking member out of the trough on the stator side, since they engage at the apex of the cylindrical locking member. When the driver is moved, a displacement of the blocking member out of the stator-side trough counter to the spring force is effected and a rotation of the rotor is made possible. The stop surfaces can also be bevelled in order to make the disengaging torque smaller.

In a further embodiment, the actuator is mounted on the stator or housing of the locking device and engages in a groove driver, as a result of which the driver is held and, upon rotation of the rotor, the blocking member is then displaced from its blocking position into a release position. In this case, the blocking member is displaced from the rotor-side trough into a stator-side trough counter to the acting spring force and finds its receptacle there. In this case, the driver also has a channel which runs in the radial direction and which, in the blocking position of the blocking part, is filled by the latter. In a special way, the parallel side surfaces of the channel act as stop surfaces on the locking member. They drive the locking member movement of the rotor from the rotor-side trough, since they engage at the apex of the cylindrical locking member.

The above-described coupling allows the door to be unlocked or locked. In the decoupled position, however, a torque transmission starting from the locking element in the direction of the rotor is blocked. In such an unauthorized attempt to rotate the rotor, a torque is generated which causes the rotor to rotate that the locking part is pressed against oblique stop surfaces on the rotor side or on the stator side and thus the blocking part is urged in the radial direction into its blocking position in addition to the spring force. In order to prevent destruction of the locking device in the case of such attacks, a corresponding movement play for the rotor is provided.

Figure 4:
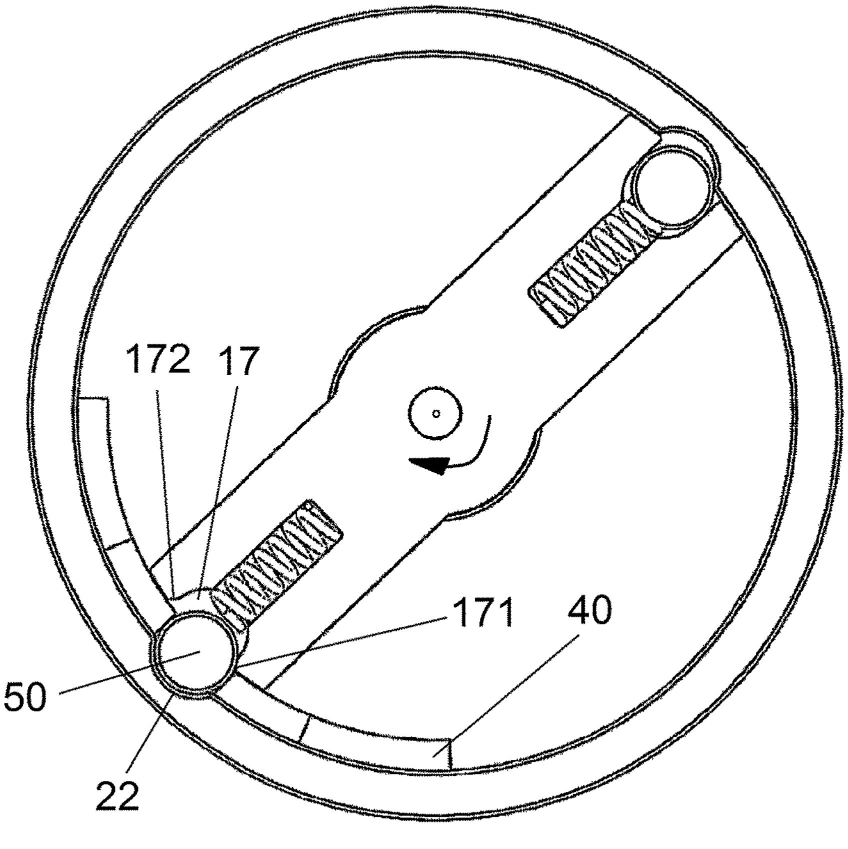
Figure 5:
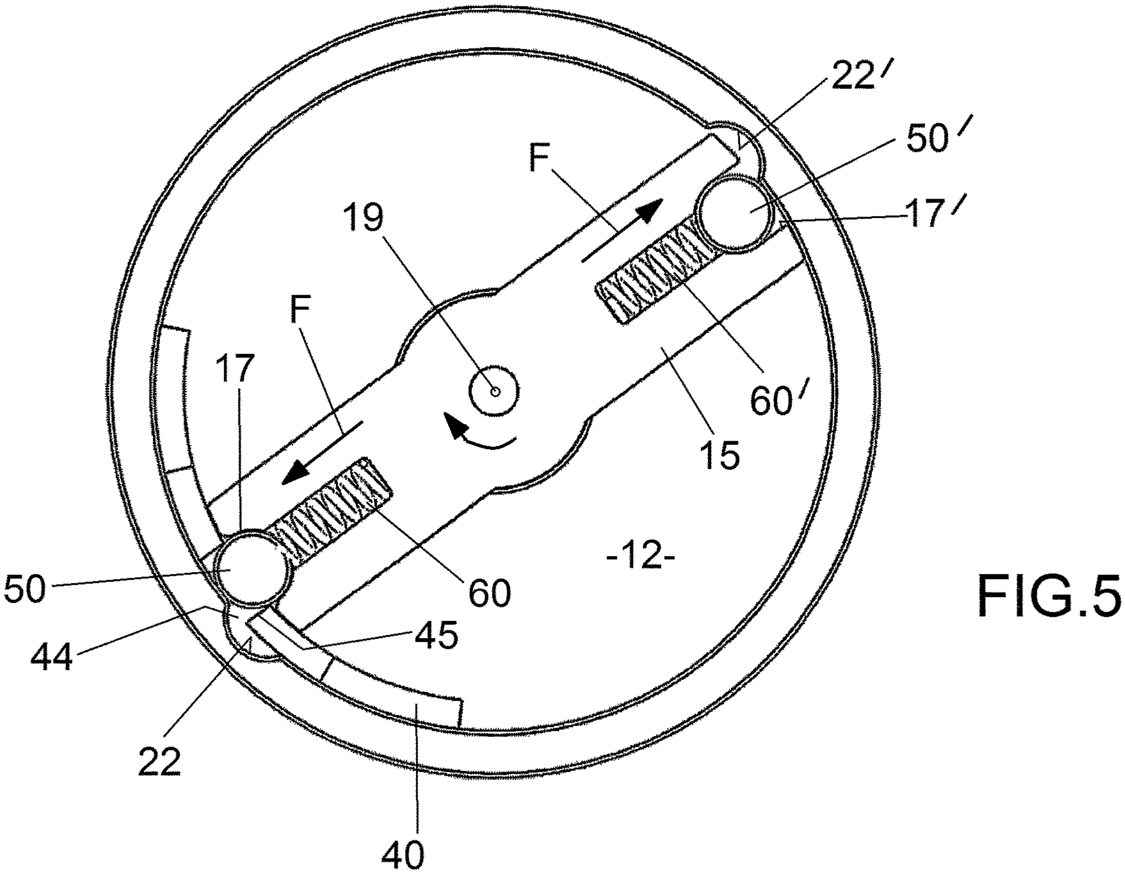
Figure 6:
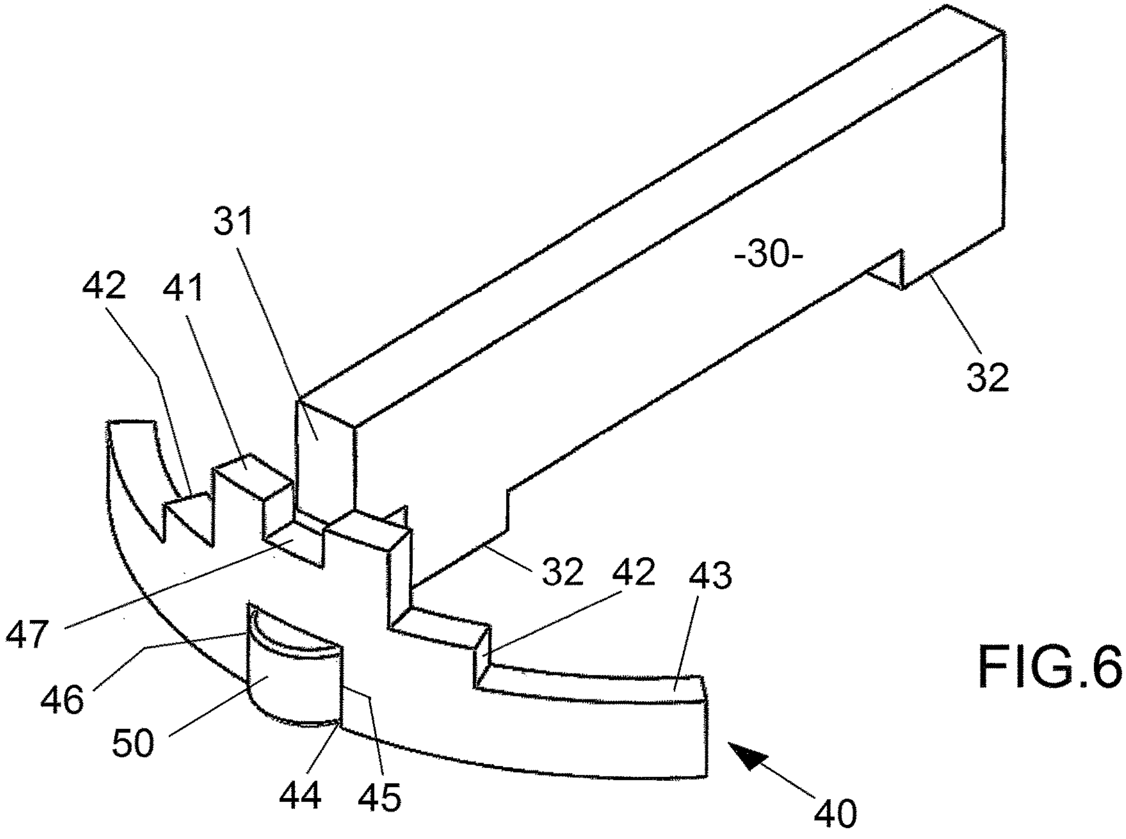
Figure 7:
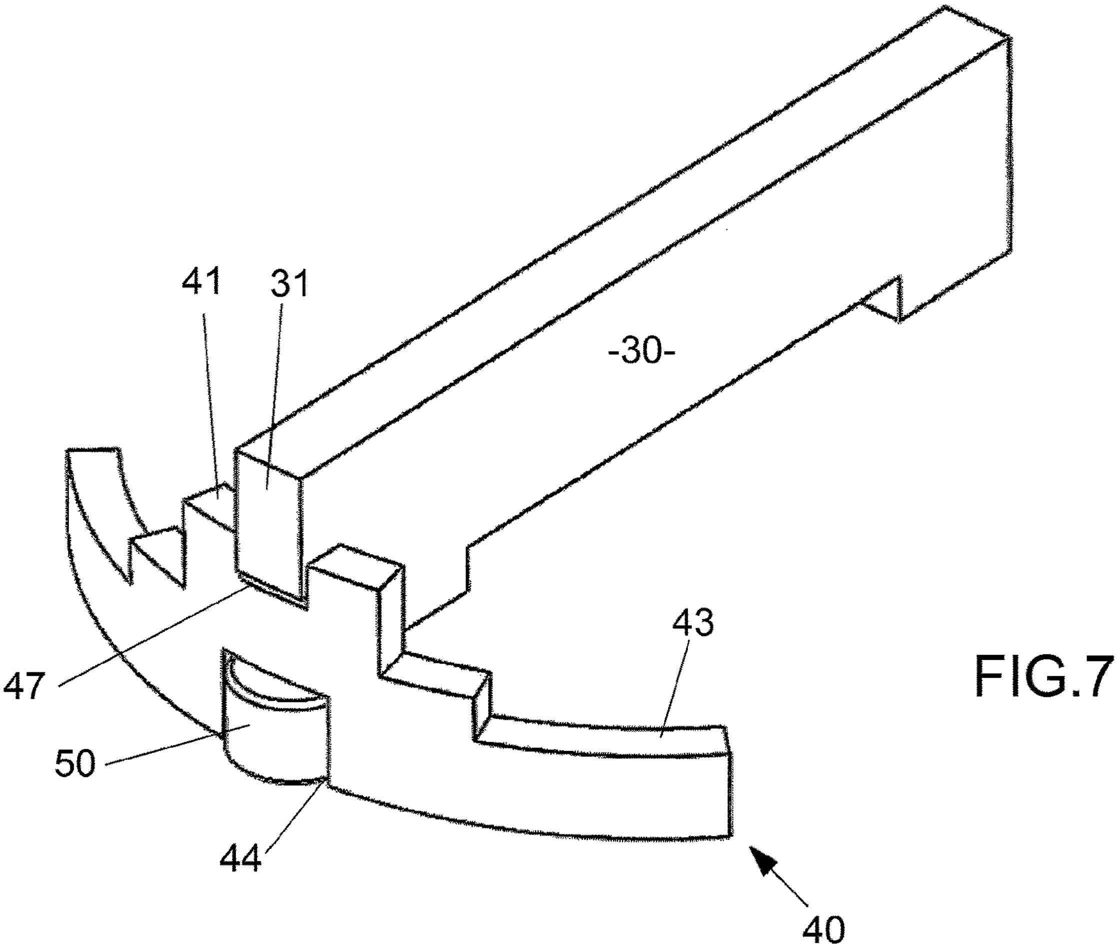
Figure 8:
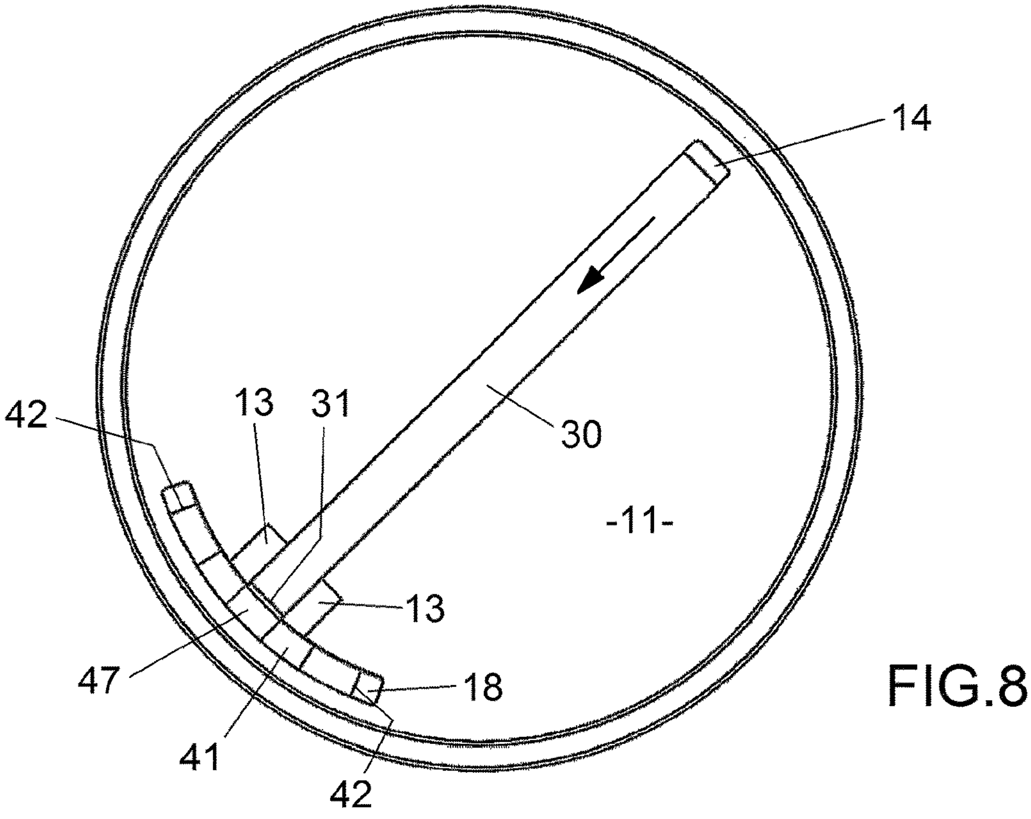
Figure 9:
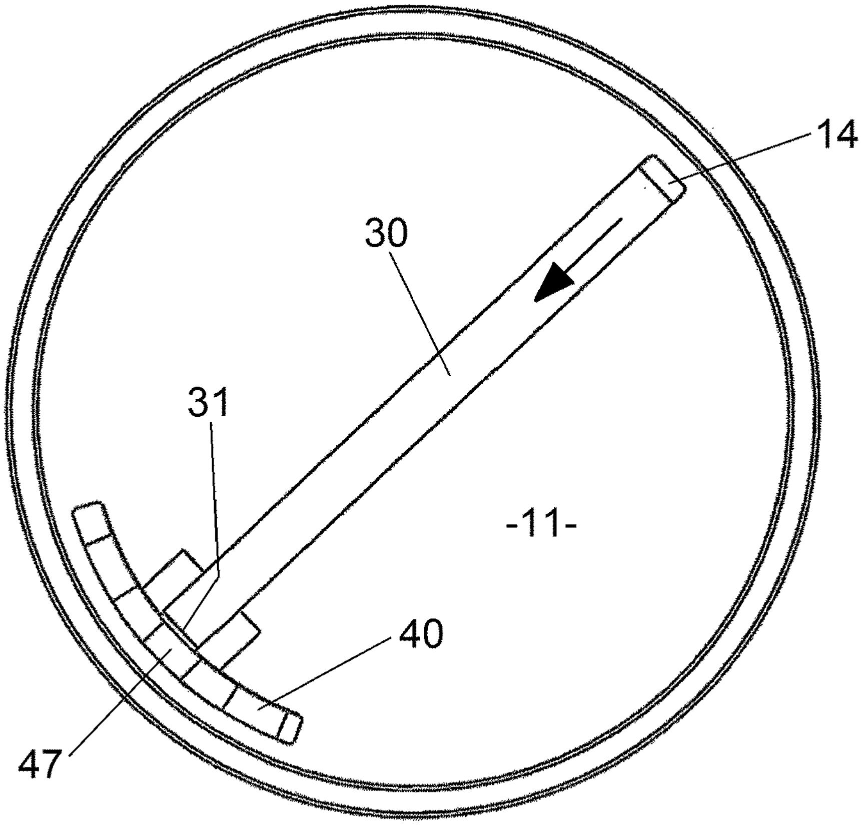
Figure 10:
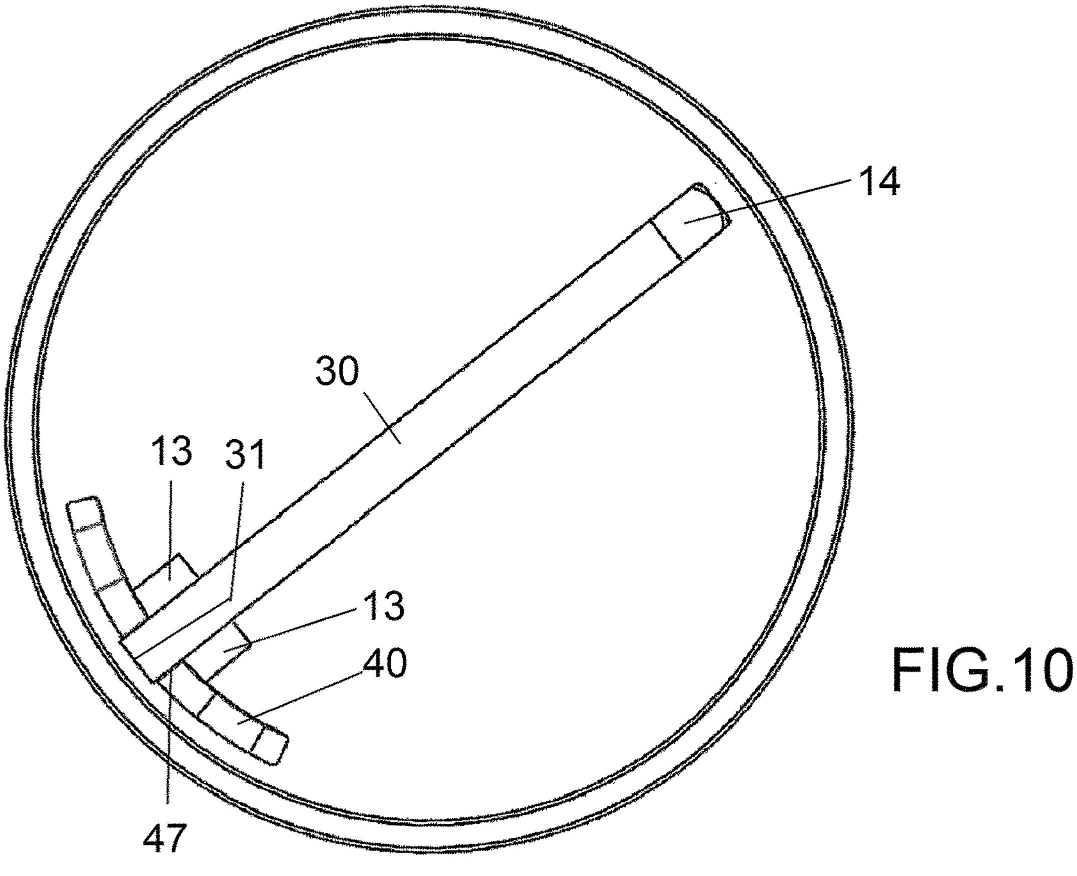
Figure 11:
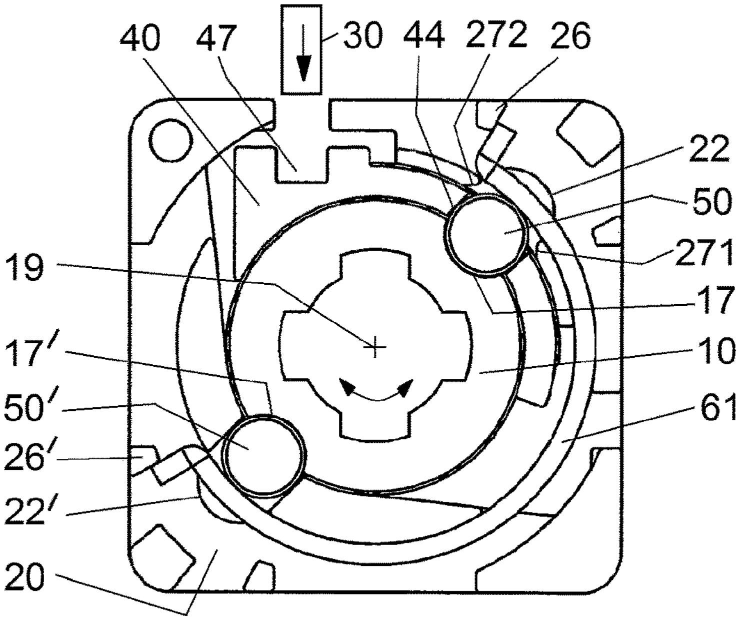
Figure 12:
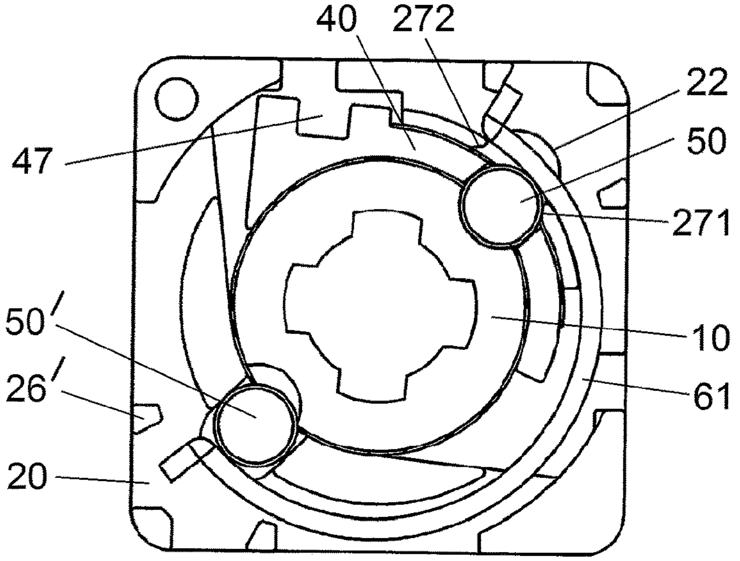
Figure 13:
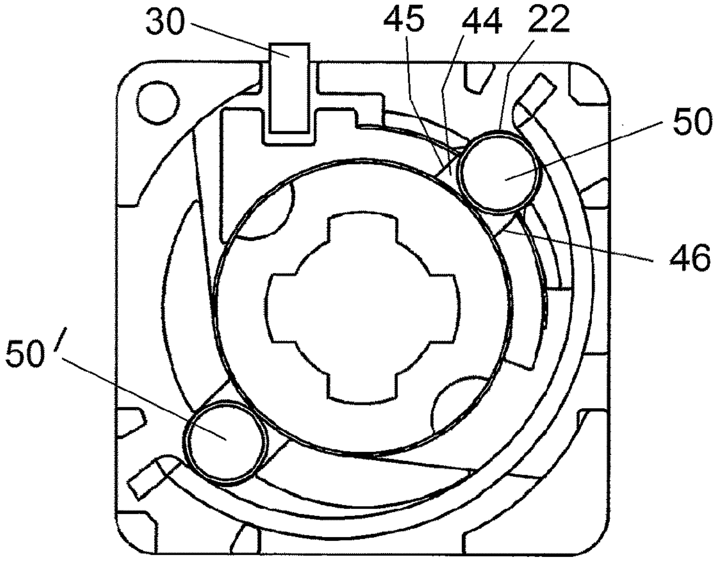

Two embodiments of the invention are described below with reference to the drawing, in which identical elements also have the same reference numerals in the different embodiments. The drawing shows:

FIG. 1 shows a perspective view of a locking device without a rotor cover,

FIG. 2 shows a view of the underside of a first locked locking device without a bottom surface of the stator, FIG. 3 shows a perspective view of the underside of a further locked locking device without a bottom surface of the stator, FIG. 4 shows a view of the underside of the locking device without the bottom surface of the stator of FIG. 3, FIG. 5 is a view of FIG. 4 in the release position, FIG. 6 is a perspective view of the coupling arrangement, FIG. 7 is a perspective view of the coupling assembly coupled, FIG. 8 shows a plan view of the rotor, FIG. 9 shows a further plan view of the rotor, FIG. 10 shows a plan view of the rotor, FIG. 11 shows a view of a further locking device in the locking position, FIG. 12 shows a view of FIG. 11 after an unauthorized rotor rotation attempt, FIG. 13 is a view of FIG. 11 in the unlocked position.

FIG. 1 shows an embodiment of the new locking device for closing doors on cabinets, boxes or compartments. The new locking device comprises a stator 20 for mounting on the door, wherein the stator 20 is pot-like, namely has a base which can be placed on the door and which is fastened to the door by means of fastening elements 24—shown in FIG. 2. A locking element 70 acts on the other side of the door in a known manner with a closing plate on the cabinet, box or the compartment to be closed. A central bore in the bottom of the stator 20 is located in front of the corresponding hole in the door for the passage of the rotor end or a drive wheel connected to the rotor after assembly. The rotor 10 or the drive wheel connected to the rotor 10 is connected directly or indirectly to a locking element 70. For example, in FIG. 1, a bolt is fastened in a rotationally fixed manner to the rotor end. In other applications, the rotor 10 is connected to a drive wheel which is connected to a corresponding gear wheel or toothed linkage interacts with the action of a corresponding locking element. For this purpose, the rotor 10 is rotatably mounted on the stator 20. As a result of the movement of the rotor 10, the locking element 70 is moved from the locking position into the unlocking position or back into the locking position.

In this example of FIG. 1, rotor 10 and stator 20 form a common outer surface. This locking device can comprise, for example, an electronic actuating device or can be accommodated in a housing together with mechanical or electronic actuating elements.

The pot-like stator 20 shown in FIG. 1 is surrounded by a wall 21. This wall 21 delimits an interior space. A view into the interior is shown in FIG. 2, where the bottom surface of the stator 20 has been omitted for the sake of better clarity. Visible is the underside 12 of the rotor 10. This rotor 10 is mounted so as to be rotatable about an axis of rotation 19. In this exemplary embodiment of FIG. 2, the rotational movement of the rotor 10 is limited by stops 23. These stops 23 are fastened to the bottom surface of the stator 20 or are part of the stator 20. A further embodiment of the locking device shows a stator 20 without stops; see FIG. 3. In the interior of the stator 20, there are furthermore two locking members 50, 50' which are pressed into troughs 22, 22' by a radially outwardly acting spring force. These troughs 22, 22' are located in the wall 21 of the stator 20. In FIG. 2 and FIG. 3 the locking position of the locking members 50, 50' is shown. The locking members 50, 50' are held in this blocking position by the force of the springs 60, 60'. The springs 60, 60' are mounted on the rotor 10 in a spring receptacle 16, 16'.

The spring receptacle 16, 16' is open at the radially outer end, so that the spring 60, 60' bears with its front end directly against the locking member 50, 50'. In this example, the spring receptacles 16, 16' are provided in a transverse beam 15 which is located on the underside 12 of the rotor 10. In this example, a continuous transverse beam 15 is provided, which with its one end for receiving the locking member 50' extends as far as the wall 21 of the stator 20. At the opposite end, the transverse beam 15 ends in front of the movement path of the driver 40, which can be moved along the wall 21.

The locking members 50, 50' only dip into the troughs 22, 22' on the stator 20. The larger part of the blocking members 50, 50' is located outside the troughs 22, 22'. In the case of the blocking member 50', the larger part is accommodated in a recess 17' on the rotor side, which is an extension of the spring receptacle 16'. The blocking member 50 also dips into such an extension of the spring receptacle 16 on the rotor 10. The central region of the blocking member 50 is located in a channel 44 of the driver 40. As can be seen from the perspective view of FIG. 6, the locking members 50, 50' have the shape of a cylinder. The cylinder axis runs parallel to the axis of rotation 19 of the rotor 10. The locking member 50, together with the driver 40 and the actuator 30, is an element of a coupling arrangement. The second locking member 50' is not an element of the coupling device and is not a necessary component of the locking device. The diametrically opposite arrangement of a second locking member 50', however, improves the realignment of the locking member 50 after the end of the rotational movement of the rotor 10.

FIG. 6 shows the elements of the coupling arrangement, namely blocking member 50, driver 40 and actuator 30 in decoupled position. In this decoupled position, rotation of the rotor 10 is not possible. If, for example, an unauthorized person attempts to rotate the locking element 70 in order to effect an opening of the locking device, this torque is transmitted to the rotor 10, which moves slightly in the direction of the turning handle, for example shown in FIG. 4. For this purpose, a movement play of the rotor 10 is provided. As shown in FIG. 2, in contrast to the blocking member 50', which is received in the extension 17' without play, the blocking member 50 in the extension 17 is not touched by the side surfaces of this extension 17, but is held in position solely by the spring force. The side surfaces of the extension 17 are formed at the outlet outlet of the extension 17 to stop bevels 171 and 172. The alignment of these stop bevels 171, 172 is selected in such a way that, in the event of an unauthorized rotary attack on the locking element, the stop bevels 171 and 172 press the blocking element 50 into the recess 22 on the stator side. In FIG. 4 by means of the stop bevel 171, an additional force is generated on the blocking member 50 in the direction of the trough 22. Due to the external rotational engagement on the locking element 70, the rotor 10 is slightly rotated, namely until the stop bevel 171 bears against the locking member 50. A further action from the outside results in the slope 171 pressing the blocking member 50 into the depression 22 in addition to the force of the spring 60 due to the acting torque. If a rotary attack is attempted in the opposite direction, the run-on slope 172 effects in the same way that the blocking position of the locking member 50 is maintained.

To actuate the locking device, an actuator 30 is actuated manually or electronically and from its decoupled rest position—shown in FIG. 6. FIG. 7 shows a coupled position. In the coupled position, there is an operative connection between the rotor 10 and the driver 40. In the present example, the actuator 30 is mounted on the rotor 10, namely displaceably in a guide recess 14 on the upper side 11 of the rotor base. The driver-side end face 31 of the actuator 30 is located for its secure guidance between two guide webs 13, which project upwards from the bottom surface of the rotor 10 on its upper side 11. In another embodiment, a pivotable actuator is also possible as part of the coupling arrangement.

The decoupled position is shown in FIGS. 1, 2, 3, 6 and 8. The actuator 30 is located with its driver-side end face 31 between the stops 13 in front of the driver 40. The driver 40 has a groove 47 in its upper part 41 opposite this driver-side end face 31 and engages through this upper part 41 of the driver 40 edge-side, radially extending slot 18 in the bottom surface of the rotor 10. This edge-side slot 18 can be seen in FIG. 8 and is located above the path of movement of the driver 40. The slot 18 is preferably longer in its longitudinal extension than the upper part 41 of the driver 40, which facilitates assembly. The driver 40 has in longitudinal extent a radially extending alignment adapted to the radius of the wall 21 of the stator 20. Only the upper part 41 passes through the slot 18 in the bottom surface of the rotor 10. In the clockwise direction, front and rear boundary surfaces 42 of the upper part 41 are located within the slot 18. Below the bottom surface of the rotor 10, the driver 40 is extended beyond these limiting surfaces 42. These end extensions on the lower part 43 of the driver 40 support the guidance thereof during the driving movement by the rotor 10. Furthermore, as already described with reference to FIG. 4, the channel 44 for the blocking member 50 is located in the lower part 43 of the driver 40, so that the rotor 10, as also shown in FIG. 9, can rotate slightly. However, a coupling with the driver 40 is not present. The driver-side end face 31 of the actuator 30 is offset with respect to the groove 47. If the actuator 30 is now correctly actuated and, in this example, a displacement of the actuator 30 within the guide recess 14 on the rotor 10 is effected, the driver-side end face 31 of the actuator 31 is pushed into the groove 47 of the driver 40; see FIG. 7 and FIG. 10. During this movement, the actuator 30, in this case with its feet 32, is guided in the guide recess 14 on the rotor. It is clear that the actuator 30 engages in the groove 47 of the driver 40. The driver 40 is now also moved by a rotation of the rotor 10. During such a movement of the rotor 10, for example counter-clockwise, which is shown on the rear side of the rotor 12 as a movement in the clockwise direction, the stop surface 45 of the entrained driver 40 strikes against the blocking member 50, see FIG. 5. Since this stop surface 45 meets the apex of the cylindrical locking member, a radially inwardly acting force acts on the blocking member 50, which presses the blocking member 50 out of the stator-side trough 22 in the direction of the extension 17 on the rotor 10 counter to the force of the spring 60. In this way, the rotation of the rotor 12 for unlocking the locking element is made possible. FIG. 5 shows the situation after the blocking member 50 is offset from the trough 22 on the stator side. If no rotation limiters are provided for the rotor 10, the latter can be moved until the locking members 50, 50' engage again in a recess 22, 22' on the stator side, after a rotation of 180 degrees in FIG. 5, it is also possible to provide further stator-side depressions 22, 22' which provisionally interrupt a rotor movement.

In the embodiment according to FIGS. 11 to 13, a reverse arrangement has been selected. In their locking position, the locking members 50, 50' bear in rotor-side depressions 17, 17' and are pushed into stator-side depressions 22, 22' when the rotor 10 is released and rotated. The release position of the locking members 50, 50' can be seen in FIG. 13. In the locking position of the locking device, shown in FIG. 11, the locking members 50, 50' are pressed into the crescent-shaped troughs 17, 17' of the rotor 10 by the radially acting force of the spring 61, which is mounted on the stator 20. In this case, the blocking members 50, 50' are received approximately in one third. The central region of the blocking member 50 is located in a channel 44 of the driver 40. The blocking member 50, together with the driver 40 and the actuator 30, is an element of a coupling arrangement. Also in this embodiment, the second locking member 50' is not an element of the coupling device and no necessary component of the locking device. The diametrically opposite arrangement of a second locking member 50', however, improves the realignment of the locking member 50 after the end of the rotational movement of the rotor 10.

FIG. 11 shows the elements of the coupling arrangement, namely the blocking member 50, the driver 40 and the actuator 30 in a decoupled position. In this decoupled position, rotation of the rotor 10 is not possible. If, for example, an unauthorized person attempts to rotate the rotor 10 via the locking element 70 in order to achieve an opening of the locking device, this torque acts on the rotor 10, but the latter moves only slightly, as shown in FIG. 12. For this purpose, a movement play of the rotor 10 is provided. The blocking member 50 is moved together with the driver 40 and, upon rotation in the clockwise direction, strikes against a stop bevel 271 or upon rotation in the opposite direction against a stop bevel 272 at the output of the stator-side trough 22. The alignment of these stop bevels 271, 272 is selected such that a force is generated which presses the blocking member 50 into the rotor-side trough 17 in addition to the spring force of the spring 61.

To actuate the locking device, an actuator 30 is inserted manually or electronically into the groove 47 on the driver 40 and from its decoupled rest position—shown in FIG. 11—into a coupled position—shown in FIG. 13. In the coupled position, there is an operative connection between the actuator 30 and the driver 40. In the present example, the actuator 30 is driven by a motor unit located outside the stator 20, which is not shown. The actuator 30 extends in a straight line from the outside into the stator 20 and within the stator into the driver 40 and holds it in position. In another embodiment, a pivotable actuator is also possible as part of the coupling arrangement. The locking member 50 is moved along by a rotation of the rotor 10. During such a movement of the rotor 10, the locking member 50 strikes against the stop face 45 or 46 of the driver 40 held in position. Since these stop surfaces 45, 46 meet the apex of the cylindrical locking member, a radially outwardly acting force acts on the blocking member 50, which presses the blocking member 50 out of the rotor-side recess 17 in the direction of the depression 22 on the stator 20 counter to the force of the spring 60. The rotation of the rotor 12 for unlocking the locking element is then possible. FIG. 13 shows the situation after the locking member 50 is displaced into the stator-side trough 22. If no rotation limiters are provided for the rotor 10, the latter can be moved until the locking members 50, 50' engage again in a recess 22, 22' on the stator side, in FIG. 13 after a rotation of 180 degrees. Further stator-side depressions 22, 22' can also be provided, which provisionally interrupt a rotor movement.

An essential element of this new locking device is the coupling arrangement comprising the actuator, the driver and the locking member, which enable a rotation of the rotor 10 when the actuation is authorized, after the locking member 50 is moved from its blocking position into a release position at the beginning of the rotational movement of the rotor 10. On the other hand, the locking device offers high anti-theft security, since unauthorized attacks on the locking element do not lead to unlocking, since high torques can be absorbed by this new locking device. A high safety standard is achieved with this locking device.

LIST OF REFERENCE SIGNS

10 Handle, rotor
11 Top side
12 Bottom side
13 Guide webs

14 Guide recess
15 Cross beam
16, 16' Spring receptacle
17, 17' Trough
171 Stop slope
172 Stop slope
18 Edge-side slot for 40
181 End of the slot, in the clockwise direction
182 End of the slot, in the clockwise direction
19 Axis of rotation
20 Housing, stator
21 wall
22, 22' Edge side trough
23 Limit stop for limiting rotation
24 Fastening means
25 Center bore
26, 26' Spring stop
271, 272 Stop slope
30 actuator
31 end face on the driver side
32 foot
40 Driver
41 Upper part
42 Boundary surface (movement within 18)
43 Bottom piece
44 channel
45 Stop surface
46 Stop surface
47 groove
50, 50' Locking member
60, 60' Spring
61 spring
70 Locking element

The invention claimed is:

1. A locking device for closing doors on cabinets, boxes or compartments, with a stator (20) for attachment to the door, wherein the stator (20) forms a pot-shaped housing shell, namely a floor which can be placed on the door and a wall (21) surrounding the floor, having a rotor (10) which is rotatably mounted on the stator (20) and can be connected at the door-side end to a locking element (70) in order to move the latter from a locking position into an unlocking position by movement of the rotor, having a blocking member (50) which can be moved between a blocking position and a release position, wherein the movement of the rotor (10) is possible only in the release position of the locking member (50), wherein a coupling arrangement (30, 40, 50) is provided which prevents unauthorized rotation of the rotor (10), the coupling arrangement (30, 40, 50) comprising a manually or electronically movable actuator (30), a driver (40) cooperating with the actuator (30) and with a locking member (50), wherein the blocking member (50) in its blocking position dips into a trough (17) on the outside of the rotor (10) or in a trough (22) on the inside of the wall (21) of the stator (20) and is held in this blocking position by spring force, wherein to release the movement of the rotor (10), the actuator (30) can be coupled to the driver (40), and the blocking member (50) can be displaced from the trough (17, 22) into a release position counter to the spring force, wherein the blocking member (50) has the shape of a cylinder and the cylinder axis runs parallel to the rotor axis (19);

characterized in that the actuator (30) is mounted movably on the rotor (10) and can be coupled to the driver (40) in order to release the movement of the rotor (10), wherein the driver (40) is movable with the rotor (10) in the coupled position and the blocking member (50) can be displaced from the stator-side trough (22) into the rotor-side trough (17) by a rotational movement of the rotor (10);

characterized in that the actuator (30) is mounted on the rotor (10) so as to be displaceable in the radial direction, wherein the actuator (30) is mounted movably in a guide recess (14) of the rotor (10), and preferably for better guidance of the actuator (30) from the upper side (11) of the bottom surface of the rotor (10) are provided guide webs (13).

2. The locking device according to claim 1, characterized in that, in the release position, the blocking member (50) is displaced from the rotor-side trough (17) into a trough (22) on the stator side or from the trough (22) on the stator side into a trough (17) on the rotor side counter to the force of a radially acting spring (60, 61).

3. The locking device according to claim 1, characterized in that the movement path of the driver (40) runs along the inner side of the wall (21) of the stator (20) and is bent in a manner adapted to its movement path in longitudinal extension.

4. The locking device according to claim 3, characterized in that the driver (40) has a channel (44) running in the radial direction in the width of the locking member (50), wherein the side surfaces of the channel (44) are formed as stop surfaces (45, 46) which, when the driver (40) moves or during a movement of the rotor (10), cause a displacement of the locking member (50).

5. The locking device according to claim 1, characterized in that the trough (22) on the stator side opposite the blocking position of the locking member (50) or on the rotor-side trough (17) on the trough outlet has stop slopes (271, 272; 171, 172) on both sides, wherein the distance of the stop slopes (271, 272; 171, 172) permits a movement play of the rotor (10).

6. The locking device according to claims 1, characterized in that the driver (40) has a groove (47) for the engagement of the actuator (30).

7. The locking device according to claim 1, characterized in that the actuator (30) is mounted so as to be movable outside the rotor (10) and can be coupled to the driver (40) in order to release the movement of the rotor (10), wherein the driver (40) is held in its position in the coupled position and the blocking member (50) can be displaced from the rotor-side trough (17) into the stator-side trough (22) by a rotational movement of the rotor (10).

8. The locking device according to claim 7, characterized in that, in the decoupled position, the driver (40) can be moved until the blocking member (50) strikes against a stop surface (271, 272) of the stator-side trough (22).

9. The locking device according to claim 7, characterized in that a spring (61) acting on the locking member (50) is mounted on the stator (20), wherein the stator (20) preferably has corresponding spring stops (26, 26').

10. The locking device according to claim 1, characterized in that, in the decoupled position, the rotor (10) can be moved until the blocking member (50) strikes against a stop surface (171, 172) of the rotor-side trough (17).

11. The locking device according to claim 1, characterized in that the rotor (10) has a bottom surface, on the underside (12) of which there is a radially oriented transverse beam (15) which projects into the interior of the pot-like stator (20) and on its end facing the wall (21) of the stator (20) has a trough (17, 17') for receiving the locking member (50, 50') when the rotor (10) is moved.

12. The locking device according to claim 11, characterized in that one end of the transverse beam (15) of the rotor (10) extends as far as the movement path of the driver (40) and the rotor (10) has on its bottom surface an edge-side slot (18) which runs along the path of movement of the driver (40) and which passes through the driver (40) from below with its upper part (41).

13. The locking device according to claim 12, characterized in that, for better guidance of the driver, the lower part (43) of the driver (40) is extended and extends along the movement path over a greater length than the length of the edge-side slot (18) of the rotor (10).

14. The locking device according to claim 11, characterized in that a spring (60) acting on the locking member (50) is mounted in a spring receptacle (16) on the transverse beam (15).

15. The locking device according to claim 1, characterized in that there are two blocking members (50, 50') which are located in diametrically opposite troughs (17, 17'; 22, 22') in the blocking position.

16. The locking device according to claim 1, characterized in that more than two troughs (17, 17'; 22, 22') on the rotor (10) or on the stator (20).

17. The locking device according to claim 1, characterized in that stops (23) for limiting the rotation on the stator (20) are arranged.

18. The locking device according to claim 1, characterised in that the outer surface of the rotor (10) is flush with the outer surface of the stator (20).

19. The locking device according to claim 1, characterized in that the rotor (10) is connected directly to the locking element (70), for example to a bolt, or in that the rotor (10) is connected indirectly to the locking element (70), for example via a drive wheel.

* * * * *